US011515758B2

(12) United States Patent
Ishikawa et al.

(10) Patent No.: US 11,515,758 B2
(45) Date of Patent: Nov. 29, 2022

(54) MOTOR UNIT

(71) Applicant: NIDEC CORPORATION, Kyoto (JP)

(72) Inventors: Yuki Ishikawa, Kyoto (JP); Takanobu Oyama, Kyoto (JP); Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 194 days.

(21) Appl. No.: 16/772,807

(22) PCT Filed: Dec. 20, 2018

(86) PCT No.: PCT/JP2018/046952
§ 371 (c)(1),
(2) Date: Jun. 15, 2020

(87) PCT Pub. No.: WO2019/131419
PCT Pub. Date: Jul. 4, 2019

(65) Prior Publication Data
US 2021/0167667 A1      Jun. 3, 2021

(30) Foreign Application Priority Data
Dec. 28, 2017   (JP) .............................. JP2017-254529

(51) Int. Cl.
*H02K 9/19*   (2006.01)
*H02K 5/20*   (2006.01)
(Continued)

(52) U.S. Cl.
CPC ............. *H02K 9/193* (2013.01); *H02K 5/203* (2021.01); *H02K 7/116* (2013.01)

(58) Field of Classification Search
CPC .......... H02K 9/19; H02K 9/193; H02K 7/116; H02K 5/20; H02K 5/203; H02K 7/006
(Continued)

(56) References Cited

U.S. PATENT DOCUMENTS 9,847,698 B2   12/2017   Yoshinori et al.
10,190,671 B2   1/2019   Kito et al.
(Continued)

FOREIGN PATENT DOCUMENTS

JP   201512714 A   1/2015
JP   201673163 A   5/2016

OTHER PUBLICATIONS

International Search Report in PCT/JP2018/046952, dated Feb. 5, 2019. 4pp.

*Primary Examiner* — Thomas Truong
(74) *Attorney, Agent, or Firm* — Hauptman Ham, LLP

(57) ABSTRACT

The motor unit includes: a motor having a motor shaft that rotates around a motor axis extending along a horizontal direction; a gear section connected to the motor shaft on one side of the motor shaft in an axial direction; a housing that houses the motor and the gear section; and an oil contained in the housing. The housing includes a motor housing section that has inside a motor chamber for housing the motor, and a gear housing section that has inside a gear chamber for housing the gear section. The housing is provided with an oil passage along which the oil circulates for cooling the motor. A pump that supplies the oil to the motor is provided in a channel of the oil passage. The pump has a pump motor. A rotation axis of the pump motor is parallel to the motor axis.

7 Claims, 6 Drawing Sheets

(51) Int. Cl.
*H02K 9/193* (2006.01)
*H02K 7/116* (2006.01)

(58) Field of Classification Search
USPC .................................. 310/54, 52, 58, 59, 83
See application file for complete search history.

(56) References Cited

U.S. PATENT DOCUMENTS

| | | | |
|---|---|---|---|
| 2004/0163409 A1* | 8/2004 | Nakajima | B60L 3/0061 |
| | | | 62/505 |
| 2014/0132058 A1 | 5/2014 | Kim | |
| 2016/0185232 A1 | 6/2016 | Suzuki et al. | |
| 2016/0223070 A1 | 8/2016 | Kito et al. | |
| 2018/0294693 A1* | 10/2018 | Yu | H02K 5/20 |
| 2019/0299769 A1* | 10/2019 | Li | H02K 7/006 |

* cited by examiner

MOTOR UNIT

CROSS-REFERENCE TO RELATED APPLICATIONS

This is the U.S. national stage of application No. PCT/JP2018/046952, filed on Dec. 20, 2018, and priority under 35 U.S.C. § 119(a) and 35 U.S.C. § 365(b) is claimed from Japanese Application No. 2017-254529, filed on Dec. 28, 2017.

FIELD OF THE INVENTION

The present invention relates to a motor unit.

BACKGROUND

Conventionally, there is disclosed a structure in which a refrigerant is cooled by a cooling device (cooler) provided outside a motor (rotary electric machine), and is supplied to the motor by a pump provided outside the motor.

A motor unit, for vehicles, which includes a transmission attached to a motor is now under development. Such a motor unit has a problem that a dead space is likely to be generated when the motor unit is mounted on a vehicle, because of a complex outer shape thereof.

SUMMARY

A motor unit according to one exemplary aspect of the present invention includes: a motor having a motor shaft that rotates around a motor axis extending along a horizontal direction; a gear section connected to the motor shaft on one side of the motor axis in an axial direction; a housing that houses the motor and the gear section; and an oil contained in the housing. The housing includes a motor housing section that has inside a motor chamber for housing the motor, and a gear housing section that has inside a gear chamber for housing the gear section. The housing is provided with an oil passage along which the oil circulates for cooling the motor. A pump that supplies the oil to the motor is provided in a channel of the oil passage. The pump has a pump motor. A rotation axis of the pump motor is parallel to the motor axis.

The above and other elements, features, steps, characteristics and advantages of the present disclosure will become more apparent from the following detailed description of the preferred embodiments with reference to the attached drawings.

DETAILED DESCRIPTION

A motor unit according to an embodiment of the present invention will be described below with reference to the accompanying drawings. Note that the scope of the present invention is not limited to the embodiment described below, but includes any modification thereof within the scope of the technical idea of the present invention.

In the following description, the direction of gravity is defined on the basis of positional relationships when a motor unit 1 is mounted on a vehicle on a horizontal road surface. In the accompanying drawings, an XYZ coordinate system is shown, as appropriate, as a three-dimensional orthogonal coordinate system. In the XYZ coordinate system, the Z-axis direction indicates the vertical direction (that is, top-bottom direction), wherein the +Z direction points upward (opposite to the direction of gravity), while the −Z direction points downward (the direction of gravity). The X-axis direction is a direction perpendicular to the Z-axis direction and indicates the front-rear direction of the vehicle on which the motor unit 1 is mounted. The +X direction points forward of the vehicle, while the −X direction points rearward of the vehicle. Note, however, that the +X direction may point rearward of the vehicle, and the −X direction may point forward of the vehicle. The Y-axis direction is a direction perpendicular to both the X-axis direction and the Z-axis direction and indicates the width direction (lateral direction) of the vehicle. The +Y direction points left of the vehicle, while the −Y direction points right of the vehicle. Note, however, that, when the +X direction points rearward of the vehicle, the +Y direction may point right of the vehicle, and the −Y direction may point left of the vehicle. That is, the +Y direction simply points one side in the lateral direction of the vehicle, and the −Y direction points the other side in the lateral direction of the vehicle, regardless of the direction of the X axis.

Unless otherwise particularly stated in the following description, a direction (Y-axis direction) parallel to a motor axis J2 of a motor 2 will be simply referred to by the term "axial direction", a radial direction centered on the motor axis J2 will be simply referred to by the term "radial direction", and a circumferential direction about the motor axis J2, that is, a direction around the motor axis J2, will be simply referred to by the term "circumferential direction". Note that the term "parallel" as used above includes both "parallel" and "substantially parallel".

Hereinafter, the motor unit (electrically driven device) 1 according to an exemplary embodiment of the present invention will be described with reference to the drawings.

Figure 1:
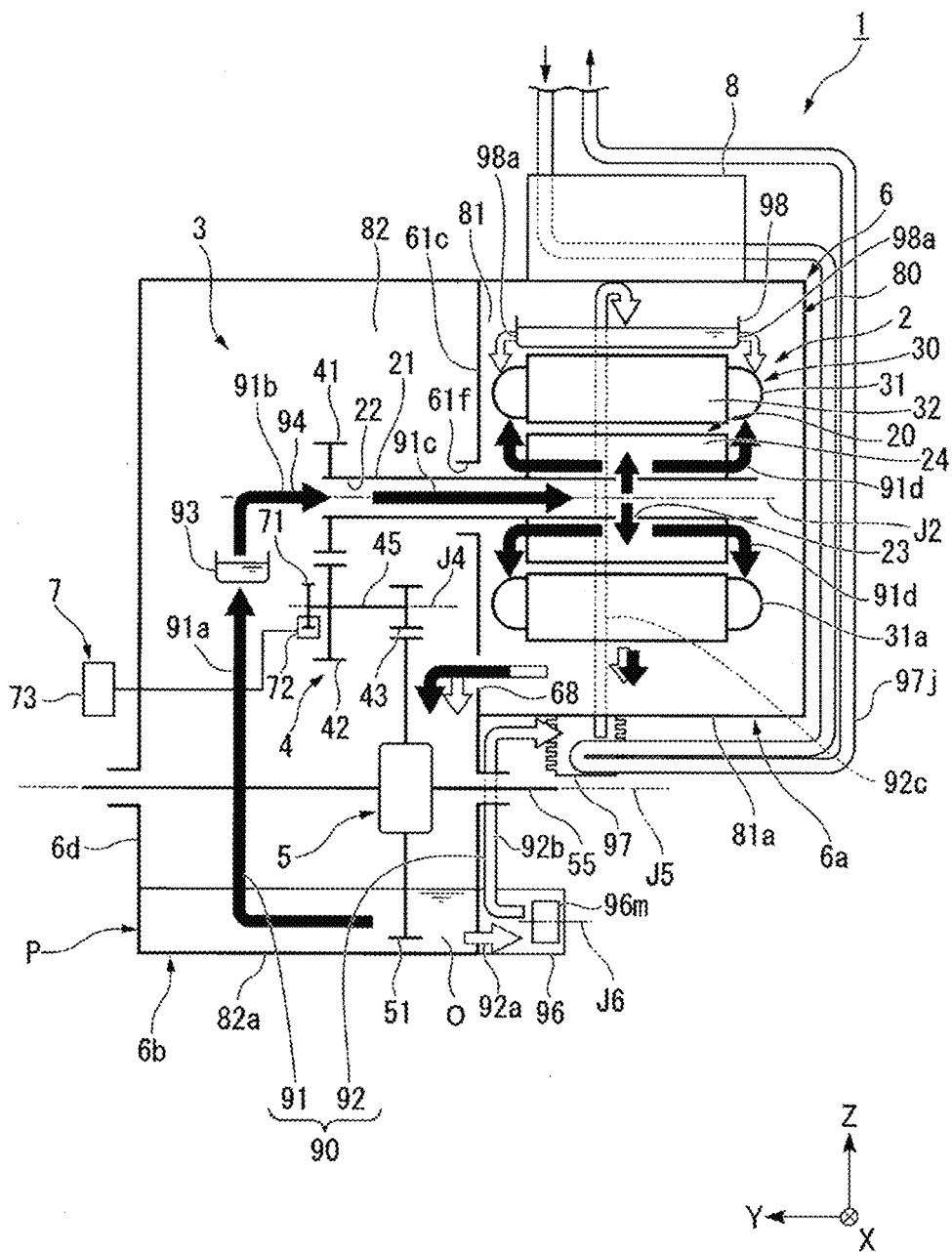
FIG. 1 is a conceptual diagram of a motor unit according to one embodiment.
Figure 2:
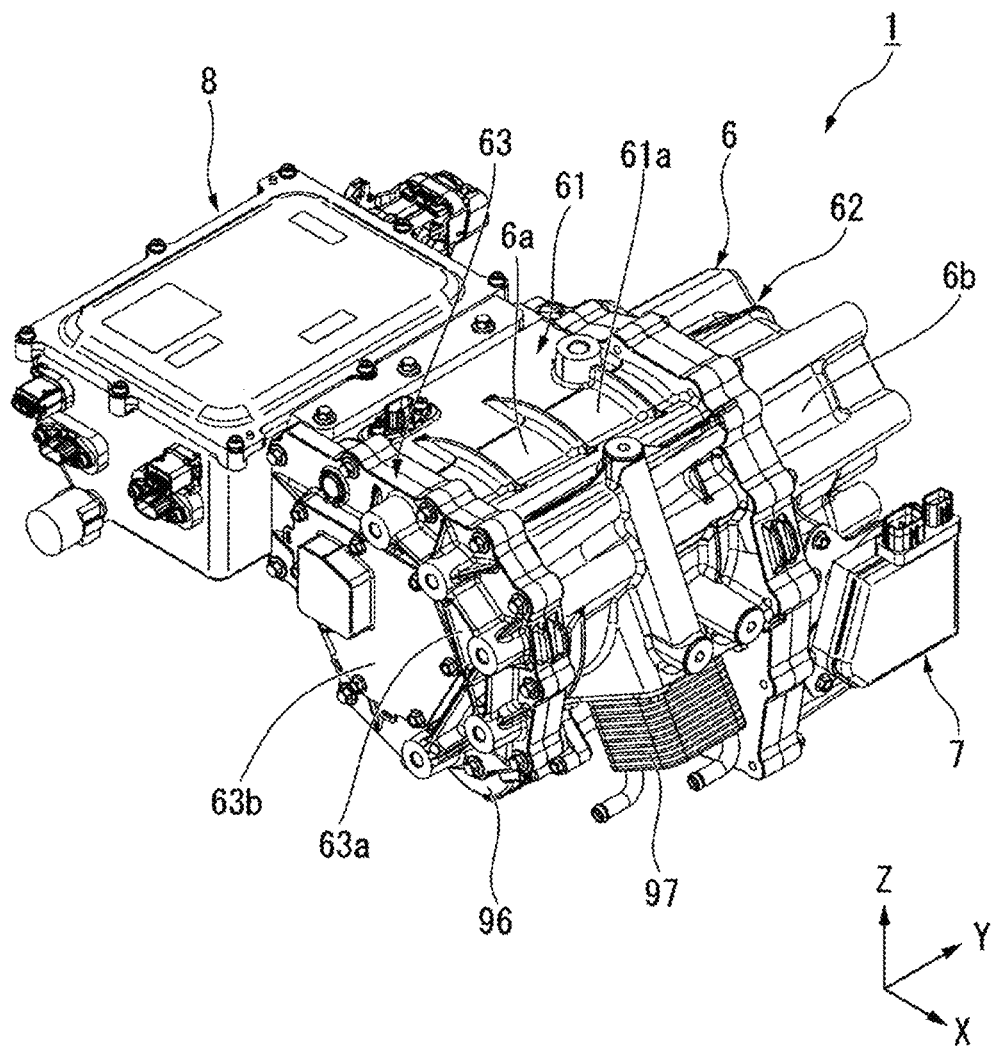
FIG. 2 is a perspective view of the motor unit according to one embodiment.

FIG. 1 is a conceptual diagram of the motor unit 1 according to one embodiment. FIG. 2 is a perspective view of the motor unit 1. FIG. 1 is just a conceptual diagram, and the arrangement and dimensions of each unit may differ from the actual arrangement and dimensions.

The motor unit 1 is mounted on a vehicle which uses a motor as a power source, such as a hybrid vehicle (HEV), a plug-in hybrid vehicle (PHV), and an electric vehicle (EV), and is used as the power source.

As shown in FIG. 1, the motor unit 1 includes a motor (main motor) 2, a gear section 3, a housing 6, an oil O contained in the housing 6, an inverter unit 8, and a parking mechanism 7.

As shown in FIG. 1, the motor 2 includes a rotor 20 that rotates about the motor axis J2 extending in the horizontal direction, and a stator 30 that is located radially outside the rotor 20. A housing space 80 for housing the motor 2 and the gear section 3 is provided inside the housing 6. The housing space 80 is divided into a motor chamber 81 that houses the motor 2 and a gear chamber 82 that houses the gear section 3.

The motor 2 is housed in the motor chamber 81 of the housing 6. The motor 2 includes the rotor 20 and the stator 30 located radially outside the rotor 20. The motor 2 is an inner rotor motor including the stator 30 and the rotor 20 disposed inside the stator 30 in a rotatable manner.

The rotor 20 rotates when electric power is supplied to the stator 30 from a battery (not shown). The rotor 20 has a shaft (motor shaft) 21, a rotor core 24, and a rotor magnet (not shown). The rotor 20 (that is, the shaft 21, the rotor core 24, and the rotor magnet) rotates around the motor axis J2 extending in the horizontal direction. The torque of the rotor 20 is transmitted to the gear section 3.

The shaft 21 extends with the motor axis J2 extending in the horizontal direction and in the width direction of the vehicle as a center. The shaft 21 rotates around the motor axis J2. The shaft 21 is a hollow shaft provided with a hollow section 22 having an inner peripheral surface extending along the motor axis J2.

The shaft 21 extends across the motor chamber 81 and the gear chamber 82 of the housing 6. One end of the shaft 21 projects into the gear chamber 82. A first gear 41 is fixed to the end of the shaft 21 protruding into the gear chamber 82.

The rotor core 24 is formed by laminating silicon steel sheets. The rotor core 24 is a cylindrical body extending along the axial direction. Multiple rotor magnets (not shown) are fixed to the rotor core 24. The multiple rotor magnets are arranged along the circumferential direction such that the magnetic poles are arranged alternately.

The stator 30 encloses the rotor 20 from outside in the radial direction. The stator 30 has a stator core 32, a coil 31, and an insulator (not shown) interposed between the stator core 32 and the coil 31. The stator 30 is held by the housing 6. The stator core 32 has a plurality of magnetic pole teeth (not shown) extending radially inward from the inner peripheral surface of an annular yoke. A coil wire is wound between the magnetic pole teeth. The coil wire wound around the magnetic pole teeth forms the coil 31. The coil wire is connected to the inverter unit 8 via a bus bar (not shown). The coil 31 has coil ends 31a projecting from each end face of the stator core 32 in the axial direction. The coil ends 31a project in the axial direction beyond the ends of the rotor core 24 of the rotor 20. The coil ends 31a project on each side in the axial direction with respect to the rotor core 24.

The gear section 3 is housed in the gear chamber 82 of the housing 6. The gear section 3 is connected to the shaft 21 on one side of the motor axis J2 in the axial direction. The gear section 3 has a reduction gear 4 and a differential 5. The torque output from the motor 2 is transmitted to the differential 5 via the reduction gear 4.

The reduction gear 4 is connected to the rotor 20 of the motor 2. The reduction gear 4 has a function of reducing the rotation speed of the motor 2 and increasing the torque output from the motor 2 according to the reduction ratio. The reduction gear 4 transmits the torque output from the motor 2 to the differential 5.

The reduction gear 4 includes a first gear (intermediate drive gear) 41, a second gear (intermediate gear) 42, a third gear (final drive gear) 43, and an intermediate shaft 45. The torque output from the motor 2 is transmitted to a ring gear (gear) 51 of the differential 5 via the shaft 21 of the motor 2, the first gear 41, the second gear 42, the intermediate shaft 45, and the third gear 43. The gear ratio of each gear, the number of gears, and the like can be variously changed according to the required reduction ratio. The reduction gear 4 is a parallel shaft gear reducer in which the axes of respective gears are arranged in parallel.

The first gear 41 is provided on the outer peripheral surface of the shaft 21 of the motor 2. The first gear 41 rotates around the motor axis J2 together with the shaft 21. The intermediate shaft 45 extends along an intermediate axis J4 parallel to the motor axis J2. The intermediate shaft 45 rotates around the intermediate axis J4. The second gear 42 and the third gear 43 are provided on the outer peripheral surface of the intermediate shaft 45. The second gear 42 and the third gear 43 are connected via the intermediate shaft 45. The second gear 42 and the third gear 43 rotate around the intermediate axis J4. The second gear 42 meshes with the first gear 41. The third gear 43 meshes with the ring gear 51 of the differential 5. The third gear 43 is located on a partition wall 61c side with respect to the second gear 42.

The differential 5 is connected to the motor 2 via the reduction gear 4. The differential 5 is a device for transmitting torque output from the motor 2 to wheels of the vehicle. The differential 5 has a function of transmitting the torque to axles 55 of the left and right wheels while absorbing the speed difference between the left and right wheels when the vehicle turns. The differential 5 includes the ring gear 51, a gear housing (not shown), a pair of pinion gears (not shown), a pinion shaft (not shown), and a pair of side gears (not shown).

The ring gear 51 rotates around a differential axis J5 parallel to the motor axis J2. The torque output from the motor 2 is transmitted to the ring gear 51 via the reduction gear 4. That is, the ring gear 51 is connected to the motor 2 via another gear.

Figure 3:
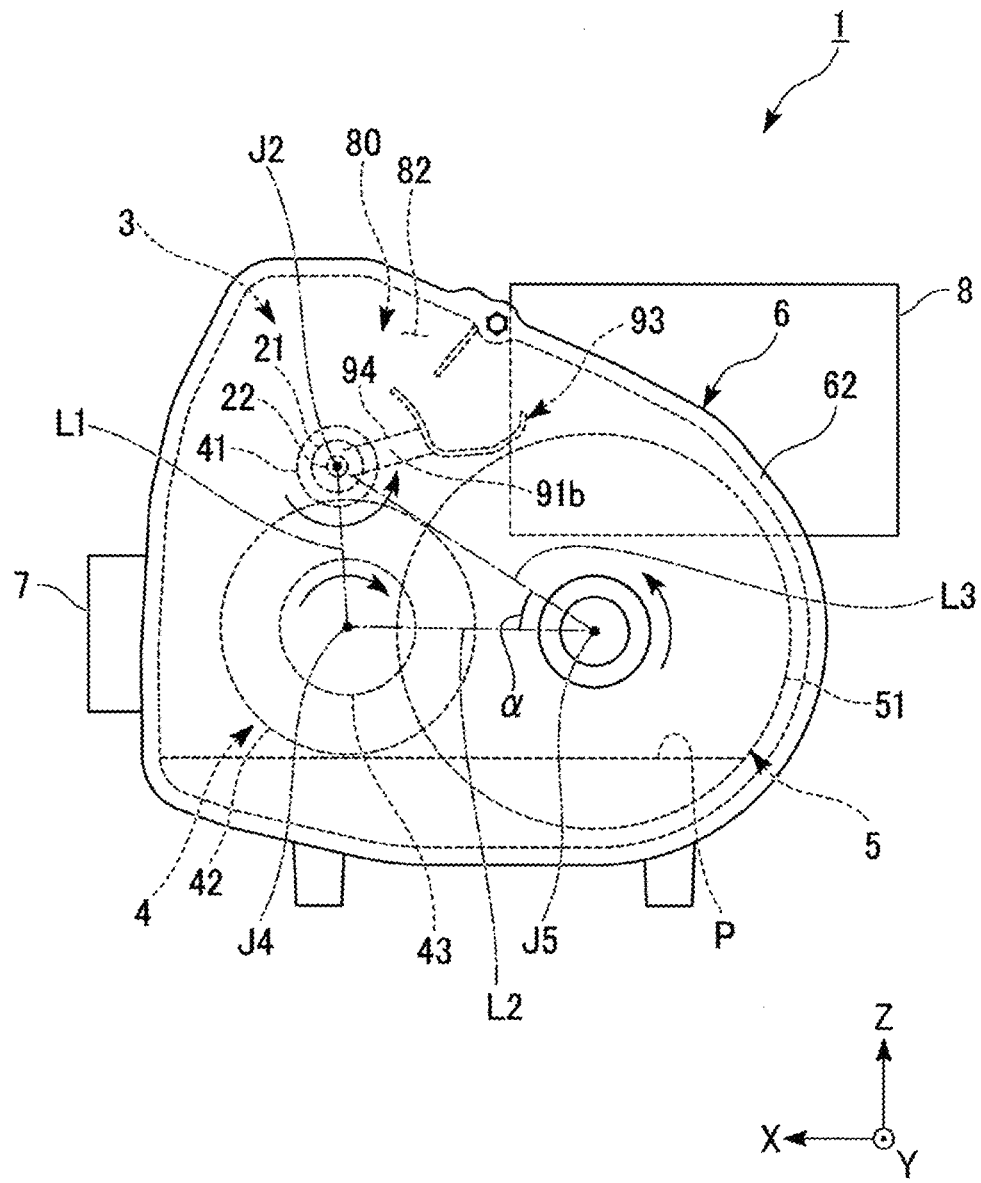
FIG. 3 is a schematic side view of the motor unit according to one embodiment.

FIG. 3 is a schematic side view of the motor unit 1.

The motor axis J2, the intermediate axis J4, and the differential axis J5 extend parallel to one another along the horizontal direction. The intermediate axis J4 and the differential axis J5 are positioned below the motor axis J2. Therefore, the reduction gear 4 and the differential 5 are located below the motor 2.

As viewed in the axial direction of the motor axis J2, a line segment virtually connecting the motor axis J2 and the intermediate axis J4 is defined as a first line segment L1, a line segment virtually connecting the intermediate axis J4 and the differential axis J5 is defined as a second line segment L2, and a line segment virtually connecting the motor axis J2 and the differential axis J5 is defined as a third line segment L3.

The second line segment L2 extends in substantially the horizontal direction. That is, the intermediate axis J4 and the differential axis J5 are arranged in substantially the horizontal direction. In the present embodiment, substantially the horizontal direction in which the second line segment L2 extends indicates a direction within ±10° with respect to the horizontal direction.

An angle α between the second line segment L2 and the third line segment L3 is 30°±5°.

The first line segment L1 extends substantially in the vertical direction. That is, the motor axis J2 and the intermediate axis J4 are arranged substantially in the vertical direction. In the present embodiment, substantially the vertical direction in which the first line segment L1 extends indicates a direction within ±10° with respect to the vertical direction.

The first line segment L1, the second line segment L2, and the third line segment L3 satisfy the following relationship regarding length.

L1:L2:L3=1:1.4–1.7:1.8–2.0

Further, the reduction ratio of a reduction mechanism from the motor 2 to the differential 5 is 8 or more and 11 or less. According to the present embodiment, a desired gear ratio (8 or more and 11 or less) can be achieved while maintaining the positional relationship among the motor axis J2, the intermediate axis J4, and the differential axis J5 as described above.

As shown in FIG. 1, the motor 2 and the gear section 3 are housed in the housing space 80 formed inside the housing 6. The housing 6 holds the motor 2 and the gear section 3 in the housing space 80. The housing 6 has the partition wall 61c. The housing space 80 of the housing 6 is divided into the motor chamber 81 and the gear chamber 82 by the partition wall 61c. The motor chamber 81 houses the motor 2. The gear chamber 82 houses the gear section 3 (that is, the reduction gear 4 and the differential 5).

An oil sump P for retaining the oil O is provided in a lower region of the housing space 80. In the present embodiment, a bottom 81a of the motor chamber 81 is located higher than a bottom 82a of the gear chamber 82. Further, the partition wall 61c for defining the motor chamber 81 and the gear chamber 82 is formed with a partition wall opening 68. The partition wall opening 68 allows the motor chamber 81 and the gear chamber 82 to communicate with each other. The oil O accumulated in the lower region of the motor chamber 81 moves to the gear chamber 82 through the partition wall opening 68.

A part of the differential 5 is submerged in the oil sump P. The oil O accumulated in the oil sump P is lifted up by the operation of the differential 5, so that a portion of the oil O is supplied to a first oil passage 91, and another portion of the oil O is distributed into the gear chamber 82. The oil O distributed into the gear chamber 82 is supplied to the respective gears of the reduction gear 4 and the differential 5 in the gear chamber 82, and fully delivered to the tooth surfaces of the gears. The oil O used for the reduction gear 4 and the differential gear 5 drops and is collected in the oil sump P in the lower region of the gear chamber 82. The capacity of the oil sump P in the housing space 80 is set such that a part of a bearing of the differential 5 is submerged in the oil O when the motor unit 1 is stopped.

As shown in FIG. 2, the housing 6 has a first housing member 61, a second housing member 62, and a closing section 63. The second housing member 62 is located on one side of the first housing member 61 in the axial direction. The closing section 63 is located on the other side of the first housing member 61 in the axial direction. The housing may be constituted by three or more members.

Figure 4:
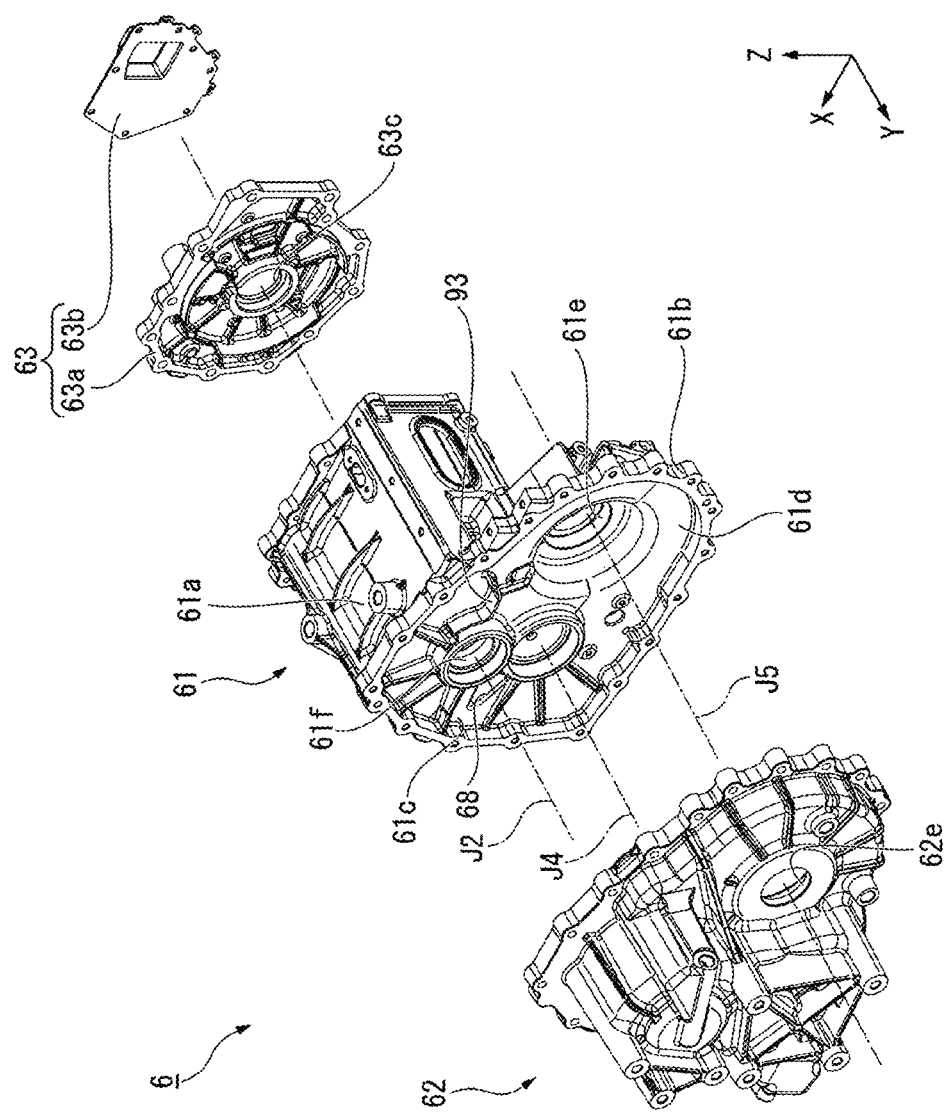
FIG. 4 is an exploded view of a housing according to one embodiment.

FIG. 4 is an exploded view of the housing 6.

The first housing member 61 has a cylindrical peripheral wall section 61a enclosing the motor 2 from the outside in the radial direction, and a side plate section 61b located on one side of the peripheral wall section 61a in the axial direction. The space inside the peripheral wall section 61a defines the motor chamber 81. The side plate section 61b has the partition wall 61c and a protruding plate 61d. The partition wall 61c covers an opening on one side of the peripheral wall section 61a in the axial direction. The partition wall 61c is provided with an insertion hole 61f through which the shaft 21 of the motor 2 is inserted, in addition to the partition wall opening 68 described above. The side plate section 61b has the partition wall 61c and the protruding plate 61d that protrudes radially outward relative to the peripheral wall section 61a. The protruding plate 61d is provided with a first axle insertion hole 61e through which a drive shaft (not shown) supporting wheels is inserted.

The closing section 63 is fixed to the peripheral wall section 61a of the first housing member 61. The closing section 63 closes an opening of the cylindrical first housing member 61. The closing section 63 has a closing section body 63a and a lid member 63b. The closing section body 63a is provided with a window 63c passing therethrough in the axial direction. The lid member 63b covers the window 63c from outside the housing space 80.

The second housing member 62 is fixed to the side plate section 61b of the first housing member 61. The second housing member 62 has a recessed shape open at the side plate section 61b side. The opening of the second housing member 62 is covered with the side plate section 61b. The space between the second housing member 62 and the side plate section 61b defines the gear chamber 82 that houses the gear section 3. The second housing member 62 is provided with a second axle insertion hole 62e. The second axle insertion hole 62e overlaps with the first axle insertion hole 61e as viewed in the axial direction.

The peripheral wall section 61a and the closing section 63 of the first housing member 61 constitute the motor chamber 81, enclose the motor 2, and house the motor 2. That is, the peripheral wall section 61a and the closing section 63 constitute a motor housing section 6a shown in FIG. 1

Similarly, the side plate section 61b of the first housing member 61 and the second housing member 62 constitute the gear chamber 82, enclose the gear section 3, and house the gear section 3. That is, the side plate section 61b and the second housing member 62 constitute a gear housing section 6b shown in FIG. 1.

As described above, the housing 6 includes the motor housing section 6a having inside the motor chamber 81 for housing the motor 2, and the gear housing section 6b having inside the gear chamber 82 for housing the gear section 3.

Figure 5:
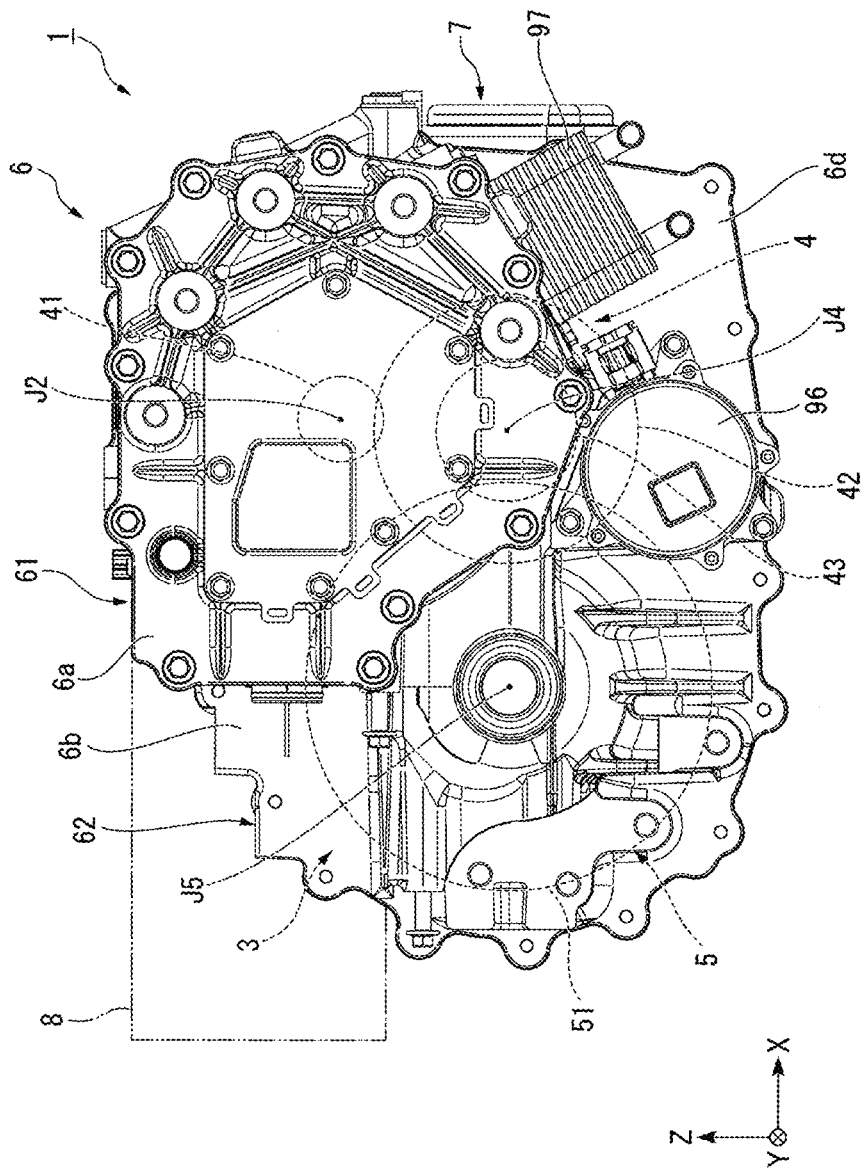
FIG. 5 is a side view of the motor unit according to one embodiment.
Figure 6:
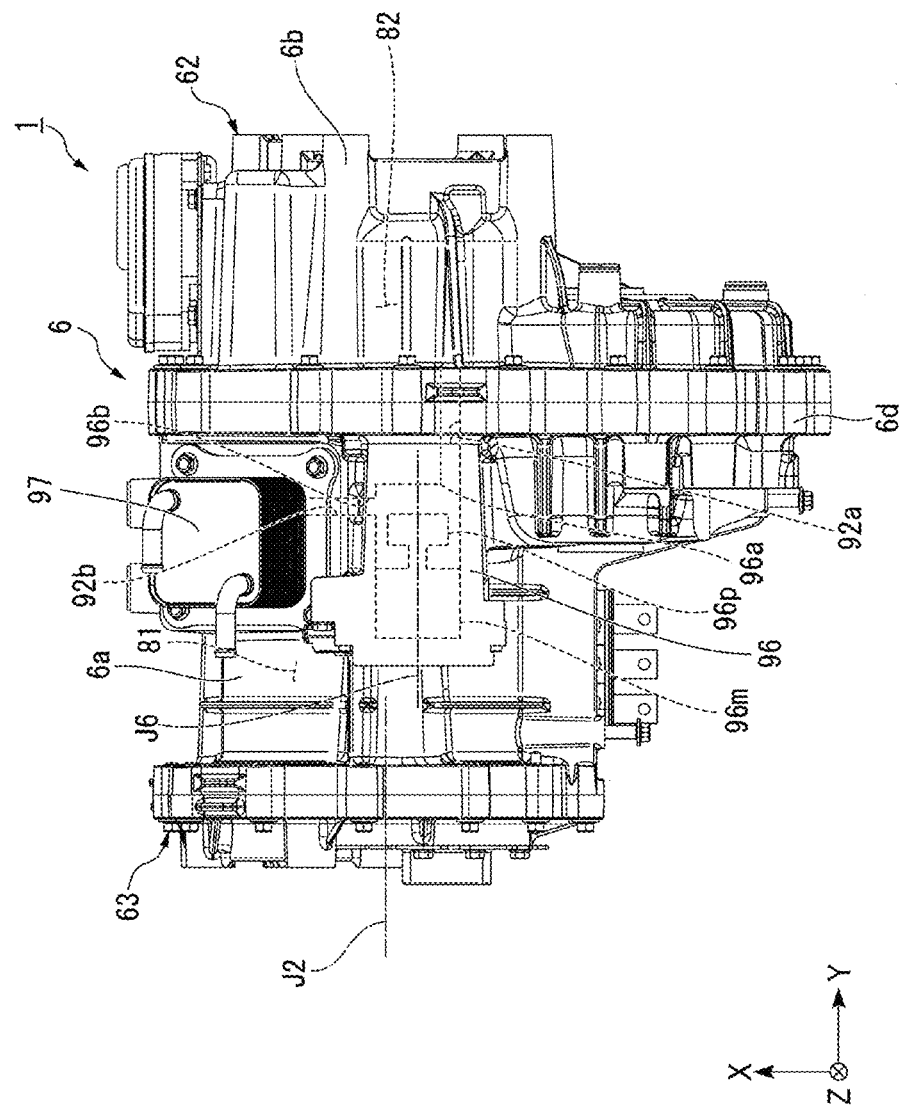
FIG. 6 is a bottom view of the motor unit according to one embodiment as viewed from bottom.

FIG. 5 is a side view of the motor unit 1. FIG. 6 is a bottom view of the motor unit 1 as viewed from bottom. In FIGS. 5 and 6, the inverter unit 8 is not shown.

As shown in FIGS. 5 and 6, the gear housing section 6b has a protruding section 6d that protrudes in the radial direction relative to the motor housing section 6a when viewed in the axial direction. In the present embodiment, the protruding section 6d protrudes to the rear and to the bottom of the vehicle relative to the motor housing section 6a. The protruding section 6d houses a part of the gear section 3. More specifically, a part of the second gear 42 and a part of the ring gear 51 are housed inside the protruding section 6d.

As shown in FIG. 1, the oil O circulates in the oil passage 90 provided in the housing 6. The oil passage 90 is a channel for the oil O along which the oil O is supplied to the motor 2 from the oil sump P. The oil O circulates along the oil passage 90 and cools the motor 2.

The oil O is used for lubricating the reduction gear 4 and the differential 5. In addition, the oil O is used for cooling the motor 2. The oil O accumulates in the lower region (that is, the oil sump P) of the gear chamber 82. It is preferable that an oil equivalent to an automatic transmission fluid (ATF) having low viscosity is used so that the oil O exhibits the function of a lubricating oil and the function of a cooling oil.

As shown in FIG. 1, the oil passage 90 is provided in the housing 6. The oil passage 90 is located in the housing space 80 in the housing 6. The oil passage 90 extends across the motor chamber 81 and the gear chamber 82 of the housing space 80. The oil passage 90 is a channel for the oil O along which the oil O is fed from the oil sump P below the motor 2 (that is, the lower region of the housing space 80) to the motor 2 and again fed back to the oil sump P below the motor 2.

In the present specification, the term "oil passage" means a channel of the oil O circulating in the housing space 80. Therefore, the "oil passage" conceptually includes not only a "flow path" in which oil constantly flows in one direction, but also a channel (for example, reservoir) in which oil temporarily stays and a channel along which oil drips.

The oil passage 90 has a first oil passage 91 passing through the inside of the motor 2 and a second oil passage (oil passage) 92 passing through the outside of the motor 2. The oil O cools the motor 2 from inside and outside through the first oil passage 91 and the second oil passage 92.

Each of the first oil passage 91 and the second oil passage 92 is a channel along which the oil O is supplied to the motor 2 from the oil sump P and again collected to the oil sump P. The oil O drops from the motor 2 through the first oil passage 91 and the second oil passage 92 and accumulates in the lower region of the motor chamber 81. The oil O accumulating in the lower region of the motor chamber 81 transfers to the lower region of the gear chamber 82 (that is, the oil sump P) through the partition wall opening 68. That is, the first oil passage 91 and the second oil passage 92 include a channel along which the oil O is transferred from the lower region of the motor chamber 81 to the lower region of the gear chamber 82.

As shown in FIG. 1, the oil O is lifted up from the oil sump P by the differential 5 and led into the rotor 20 through the first oil passage 91. The oil O is given a centrifugal force caused by the rotation of the rotor 20 inside the rotor 20. Thus, the oil O is uniformly distributed toward the stator 30 which encloses the rotor 20 from outside in the radial direction, thereby cooling the stator 30.

The first oil passage 91 has a lifting channel 91a, a shaft supply channel 91b, a shaft inner channel 91c, and a rotor inner channel 91d. A first reservoir 93 is provided in the channel of the first oil passage 91. The first reservoir 93 is provided in the gear chamber 82.

The lifting channel 91a is a channel along which the oil O is lifted up from the oil sump P by the rotation of the ring gear 51 of the differential 5. The lifted oil O is received by the first reservoir 93. As shown in FIG. 3, the first reservoir 93 is disposed between the intermediate axis J4 and the differential axis J5. The first reservoir 93 opens upward. The first reservoir 93 receives the oil O that has been lifted up by the ring gear 51. In a case where, for example, the level of the oil in the oil sump P is high, such as immediately after the motor 2 is driven, the first reservoir 93 receives the oil O lifted up by not only the ring gear 51 but also the second gear 42 and the third gear 43.

The shaft supply channel 91b guides the oil O from the first reservoir 93 to the motor 2. The shaft supply channel 91b is constituted by a hole 94 provided in the second housing member 62. The shaft inner channel 91c is a channel along which the oil O passes through the hollow section 22 of the shaft 21. The rotor inner channel 91d is a channel along which the oil O passes through the inside of the rotor core 24 through a communication hole 23 of the shaft 21 and is distributed to the stator 30.

In the shaft inner channel 91c, the oil O inside the rotor 20 is given a centrifugal force caused by the rotation of the rotor 20. As a result, the oil O is continuously distributed radially outward from the rotor 20. Further, as the oil O is distributed, a negative pressure is generated in the channel inside the rotor 20, so that the oil O accumulated in the first reservoir 93 is sucked into the rotor 20. Thus, the channel inside the rotor 20 is filled with the oil O.

The oil O that has reached the stator 30 absorbs heat from the stator 30. The oil O that has cooled the stator 30 drops down and accumulates in the lower region of the motor chamber 81. The oil O accumulating in the lower region of the motor chamber 81 transfers to the gear chamber 82 through the partition wall opening 68 formed in the partition wall 61c.

As shown in FIG. 1, the oil O is lifted up over the motor 2 from the oil sump P and supplied to the motor 2 through the second oil passage 92. The oil O supplied to the motor 2 absorbs heat from the stator 30 while flowing along the outer peripheral surface of the stator 30, and thus cools the motor 2. The oil O flowing along the outer peripheral surface of the stator 30 drops down and accumulates in the lower region of the motor chamber 81. The oil O in the second oil passage 92 joins the oil O in the first oil passage 91 in the lower region of the motor chamber 81. The oil O accumulating in the lower region of the motor chamber 81 transfers to the lower region of the gear chamber 82 (that is, the oil sump P) through the partition wall opening 68.

The second oil passage 92 has a first flow passage 92a, a second flow passage 92b, and a third flow passage 92c. A pump 96, a cooler 97, and a second reservoir 98 are provided in the channel of the second oil passage 92. The pump 96 supplies the oil O to the motor 2. Further, the cooler 97 cools the oil O passing through the second oil passage 92. In the second oil passage 92, the oil O passes through the first flow passage 92a, the pump 96, the second flow passage 92b, the cooler 97, the third flow passage 92c, and the second reservoir 98 in this order, and is supplied to the motor 2.

The first flow passage 92a, the second flow passage 92b, and the third flow passage 92c pass through the wall of the housing 6 enclosing the housing space 80. The first flow passage 92a connects the oil sump P and the pump 96. The second flow passage 92b connects the pump 96 and the cooler 97. The third flow passage 92c connects the cooler 97 and the housing space 80.

In the present embodiment, the first flow passage 92a, the second flow passage 92b, and the third flow passage 92c pass through the inside of the wall of the housing 6 enclosing the housing space 80. This configuration eliminates the need to separately prepare tubes, and thus contributes to reducing the number of components.

The pump 96 is an electric pump driven by electricity. The pump 96 sucks the oil O from the oil sump P through the first flow passage 92a, and supplies the oil O to the motor 2 through the second flow passage 92b, the cooler 97, the third flow passage 92c, and the second reservoir 98.

As shown in FIG. 6, the pump 96 has a pump mechanism 96p, a pump motor 96m, a suction port 96a, and a discharge port 96b. In the present embodiment, the pump mechanism 96p is a trochoidal pump in which inner and outer gears (not shown) rotate while being meshed with each other. The inner gear of the pump mechanism 96p is rotated by the pump motor 96m. The gap between the inner gear and the outer gear of the pump mechanism 96p is connected to the suction port 96a and the discharge port 96b.

The suction port 96a of the pump 96 is connected to the first flow passage 92a. Further, the discharge port 96b of the pump 96 is connected to the second flow passage 92b. The pump 96 sucks the oil O from the oil sump P through the first flow passage 92a, and supplies the oil O to the motor 2 through the second flow passage 92b, the cooler 97, the third flow passage 92c, and the second reservoir 98.

The pump motor 96m rotates the inner gear of the pump mechanism 96p. A rotation axis J6 of the pump motor 96m is parallel to the motor axis J2. The pump 96 having the pump motor 96m tends to be long in the direction of the rotation axis J6. According to the present embodiment, the rotation axis J6 of the pump motor 96m extends parallel to the motor axis J2, whereby the dimension of the motor unit 1 in the radial direction can be reduced. Further, due to the reduction in dimension of the motor unit 1 in the radial direction, the pump 96 is easily disposed so as to overlap with the protruding section 6d of the housing 6 as viewed in the axial direction. As a result, it is possible to achieve a structure in which the motor unit 1 can be easily reduced in size by suppressing an increase in projected area of the motor unit 1 in the axial direction.

The pump 96 is located below the motor chamber 81. The pump 96 is fixed to a surface of the protruding section 6d facing the motor housing section 6a. The suction port 96a of the pump 96 is disposed to face the protruding section 6d. The first flow passage 92a connected to the suction port 96a of the pump 96 linearly passes through the wall surface of the protruding section 6d in the axial direction, and opens to the lower region of the gear chamber 82. That is, the protruding section 6d is provided with the first flow passage 92a extending along the axial direction from the lower region of the gear chamber 82 (that is, the oil sump P) to the pump 96.

According to the present embodiment, the pump 96 is disposed below the motor chamber 81, whereby the suction port 96a can be easily disposed near the oil sump P. As a result, the first flow passage 92a connecting the oil sump P and the suction port 96a can be shortened. Further, since the distance between the oil sump P and the suction port 96a is short, the first flow passage 92a can be linearly formed. Due to the configuration in which the first flow passage 92a is short and linear, a pressure loss in the channel from the oil sump P to the pump 96 can be reduced to enable efficient circulation of the oil O.

As shown in FIG. 1, the first flow passage 92a and the second flow passage 92b are connected to the cooler 97. The first flow passage 92a and the second flow passage 92b are connected to each other via an internal flow passage of the cooler 97. The cooler 97 is connected with a cooling water pipe 97j through which cooling water cooled by a radiator (not shown) passes. The oil O passing through the inside of the cooler 97 is cooled by heat exchange with the cooling water passing through the cooling water pipe 97j. The inverter unit 8 is provided in the channel of the cooling water pipe 97j. The cooling water passing through the cooling water pipe 97j cools the inverter unit 8.

As shown in FIG. 5, the cooler 97 is fixed to the outer peripheral surface of the motor housing section 6a facing outward in the radial direction below the motor chamber 81. As shown in FIG. 1, the oil O supplied to the motor 2 is temporarily accumulated in the lower region of the motor chamber 81, and then transfers to the lower region of the gear chamber 82 through the partition wall opening 68. According to the present embodiment, the cooler 97 is fixed to the outer peripheral surface of the motor housing section 6a below the motor chamber 81, and thus, the oil O accumulated in the lower region of the motor chamber 81 can be cooled via the wall surface of the motor housing section 6a from the installation surface of the cooler 97.

As shown in FIG. 5, the cooler 97 and the pump 96 at least partially overlap with the protruding section 6d of the gear housing section 6b when viewed in the axial direction. The gear section 3 is housed inside the protruding section 6d. The projected area of the protruding section 6d in the axial direction is determined depending on the size of each gear of the gear section 3. The size of each gear constituting the gear section 3 is set to satisfy a desired gear ratio. For this reason, it is difficult to reduce the projected area of the protruding section 6d in the axial direction. According to the present embodiment, the cooler 97 and the pump 96 are disposed so as to overlap with the protruding section 6d in the axial direction, whereby an increase in the projected area of the motor unit 1 in the axial direction due to the cooler 97 and the pump 96 can be suppressed. Thus, the motor unit 1 can be downsized by suppressing an increase in the projected area of the motor unit 1 in the axial direction.

According to the present embodiment, the cooler 97 and the pump 96 at least partially overlap with the second gear 42 of the gear section 3 when viewed in the axial direction. Therefore, such a configuration is achieved in which, even if the projected area of the protruding section 6d as viewed in the axial direction is reduced as much as possible along the outer shape of each gear of the gear section 3, the cooler 97 and the pump 96 overlap with the protruding section 6d as viewed in the axial direction. Thus, the motor unit 1 can be downsized by suppressing an increase in the projected area of the motor unit 1 in the axial direction.

According to the present embodiment, the cooler 97 and the pump 96 are located above the lower end of the protruding section 6d. That is, the cooler 97 and the pump 96 do not protrude downward beyond the lower end of the protruding section 6d. Therefore, the size of the motor unit 1 can be reduced in the top-bottom direction.

The cooler 97 and the pump 96 are located below the motor chamber 81 in the vertical direction. The motor unit 1 is mounted, for example, in a hood of a vehicle. Further, in the motor unit 1, the cooler 97 and the pump 96 are protruding objects protruding from the housing 6. According to the present embodiment, the cooler 97 and the pump 96 are mounted below the motor chamber 81 in the vertical direction. Therefore, even when the vehicle collides with an object due to an accident or the like, the cooler 97 and the pump 96 that are protruding objects can be prevented from hitting the object.

According to the present embodiment, the pump 96 and the cooler 97 are fixed to the outer peripheral surface of the housing 6. This configuration can contribute to reducing the size of the motor unit 1, compared with the case where the pump 96 and the cooler 97 are fixed to a structure outside the housing 6. In addition, the pump 96 and the cooler 97 are fixed to the outer peripheral surface of the housing 6, whereby a flow passage that connects the housing space 80 to the pump 96 and the cooler 97 can be formed by the first flow passage 92a, the second flow passage 92b, and the third flow passage 92c which pass through the wall of the housing 6.

According to the present embodiment, the position of the pump 96 and the position of the cooler 97 in the axial direction overlap each other as shown in FIG. 6. The cooler 97 and the pump 96 are connected via the second flow passage 92b. That is, the second flow passage 92b connecting the pump 96 and the cooler 97 is formed in the second oil passage 92. According to the present embodiment, the pump 96 and the cooler 97 overlap each other in the axial direction, whereby a structure in which the second flow passage 92b is linearly extended in a direction perpendicular to the axial direction can be achieved. That is, the second flow passage 92b can be linearly formed with a shorter length, whereby the pressure loss in the channel from the pump 96 to the cooler 97 can be reduced to enable efficient circulation of the oil O.

As shown in FIG. 1, the second reservoir 98 is located in the motor chamber 81 of the housing space 80. The second reservoir 98 is located above the motor. The second reservoir 98 stores the oil O supplied to the motor chamber 81 via the third flow passage 92c. The second reservoir 98 has a plurality of outlets 98a. The oil O accumulated in the second reservoir 98 is supplied to the motor 2 through the outlets 98a. The oil O flowing out through the outlets 98a of the second reservoir 98 absorbs heat of the motor 2, while flowing along the outer peripheral surface of the motor 2 from top to bottom. Thus, the entire motor 2 can be cooled.

The second reservoir 98 extends along the axial direction. The outlets 98a of the second reservoir 98 are provided at both ends in the axial direction of the second reservoir 98. The outlets 98a are located above the coil ends 31a. Thus, the coil 31 can be directly cooled by applying the oil O to the coil ends 31a located at both ends of the stator 30 in the axial direction.

The oil O that has cooled the coil 31 drops and accumulates in the lower region of the motor chamber 81. The oil O accumulating in the lower region of the motor chamber 81 transfers to the gear chamber 82 through the partition wall opening 68 formed in the partition wall 61c.

According to the present embodiment, the cooler 97 that cools the oil O is provided in the channel of the second oil passage 92. The oil O passing through the second oil passage 92 and cooled by the cooler 97 joins the oil O passing through the first oil passage 91 in the oil sump P. In the oil sump P, the oil O that has passed through the first oil passage 91 and the second oil passage 92 is mixed with each other to perform heat exchange. Therefore, the cooling effect of the cooler 97 that is arranged in the channel of the second oil passage 92 can also be exerted on the oil O passing through the first oil passage 91.

The inverter unit 8 is electrically connected to the motor 2. The inverter unit 8 controls a current supplied to the motor 2. As shown in FIG. 5, the inverter unit 8 is fixed to the housing 6. More specifically, the inverter unit 8 is fixed to the outer peripheral surface of the motor housing section 6a facing radially outward.

The inverter unit 8 at least partially overlaps with the protruding section 6d of the gear housing section 6b when viewed in the axial direction. According to the present embodiment, the inverter unit 8 is disposed so as to overlap with the protruding section 6d in the axial direction, whereby an increase in the projected area of the motor unit 1 in the axial direction due to the inverter unit 8 can be suppressed. Thus, the motor unit 1 can be downsized by suppressing an increase in the projected area of the motor unit 1 in the axial direction.

According to the present embodiment, the inverter unit 8 at least partially overlaps with the ring gear 51 of the gear section 3 when viewed in the axial direction. Therefore, such a configuration is achieved in which, even if the projected area of the protruding section 6d as viewed in the axial direction is reduced as much as possible along the outer shape of each gear of the gear section 3, the inverter unit 8 overlaps with the protruding section 6d as viewed in the axial direction. Thus, the motor unit 1 can be downsized by suppressing an increase in the projected area of the motor unit 1 in the axial direction.

According to the present embodiment, the inverter unit 8 is located on the opposite side of the cooler 97 with respect to the motor axis J2 when viewed in the vertical direction. Therefore, the size of the motor unit 1 in the horizontal direction can be reduced by effectively using the region overlapping with the protruding section 6d as viewed in the axial direction, whereby the motor unit 1 can be downsized.

As shown in FIG. 1, the cooling water pipe 97j extending from a radiator (not shown) is connected to the inverter unit 8. Thus, the inverter unit 8 can be efficiently cooled. In addition, the cooling water flowing through the cooling water pipe 97j also cools the motor housing section 6a that is in contact with a casing of the inverter unit 8 via the casing.

An electric vehicle has no brake mechanism to brake the vehicle other than a parking brake, and is therefore required to have the parking mechanism 7 in the motor unit 1.

As shown in FIG. 1, the parking mechanism 7 includes: a parking gear 71 which is fixed to the intermediate shaft 45 and rotates around the intermediate axis J4 together with the intermediate shaft 45; a rotation prevention section 72 that moves between teeth of the parking gear 71 to prevent rotation of the parking gear 71; and a parking motor 73 that drives the rotation prevention section 72. When the motor 2 is in operation, the rotation prevention section 72 retreats from the parking gear 71. On the other hand, when the shift lever is in the parking position, the parking motor 73 moves the rotation prevention section 72 between the teeth of the parking gear 71 to stop the rotation of the parking gear 71.

While the exemplary embodiment and the modification of the present invention have been described above, the configuration described in the embodiment and the combination thereof are merely examples, and addition, omission, replacement, and other various modifications may be appropriately made within the scope of the present invention. It should also be noted that the present invention is not limited by the embodiment.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor unit comprising:
   a motor having a motor shaft that rotates around a motor axis extending along a horizontal direction;
   a gear section connected to the motor shaft on one side of the motor shaft in an axial direction of the motor axis;
   a housing that houses the motor and the gear section; and
   an oil contained in the housing,
   wherein
   the housing includes:
      a motor housing section that has inside a motor chamber for housing the motor, and
      a gear housing section that has inside a gear chamber for housing the gear section,
   the housing is provided with an oil passage along which the oil circulates for cooling the motor,
   a pump that supplies the oil to the motor is provided in a channel of the oil passage, the pump has a pump motor,
   a rotation axis of the pump motor is parallel to the motor axis,
   the gear housing section has a protruding section protruding in a radial direction of the motor axis relative to the motor housing section as viewed in the axial direction of the motor axis,
   the pump at least partially overlaps with the protruding section as viewed in the axial direction of the motor axis, and
   at least a part of the pump is directly fixed to an outer surface of the protruding section.

2. The motor unit according to claim 1, wherein
the oil passage includes a channel along which the oil transfers to a lower region of the gear chamber from a lower region of the motor chamber,
the pump is located below the motor chamber in a vertical direction, and
the protruding section is provided with a flow passage that extends from the lower region of the gear chamber to the pump along the axial direction of the motor axis.

3. The motor unit according to claim 2, wherein (i) a cooler for cooling the oil passing through the oil passage and (ii) a further flow passage that connects the pump and the cooler are provided in a further channel of the oil passage, the pump and the cooler being located in different positions in the axial direction of the motor axis.

4. The motor unit according to claim 3, wherein the cooler and the pump are located below the motor chamber in the vertical direction.

5. The motor unit according to claim 1, wherein (i) a cooler for cooling the oil passing through the oil passage and (ii) a flow passage that connects the pump and the cooler are provided in a channel of the oil passage, the pump and the cooler being located in different positions in the axial direction of the motor axis.

6. The motor unit according to claim 5, wherein the cooler and the pump are located below the motor chamber in a vertical direction.

7. The motor unit according to claim 1, wherein
the gear section includes a differential and a reduction gear, and
the pump partially overlaps at least one of the differential or the reduction gear as viewed in the axial direction.

* * * * *